US009638339B2

(12) United States Patent
 Schwetz et al.

(10) Patent No.: US 9,638,339 B2
(45) Date of Patent: May 2, 2017

(54) DIAPHRAGM VALVE

(71) Applicant: Buerkert Werke GmbH, Ingelfingen (DE)

(72) Inventors: Karsten Schwetz, Heilbronn (DE); Marcel Konstandin, Karlsruhe (DE); Jan Westermann, Karlsruhe (DE)

(73) Assignee: Buerkert Werke GmbH, Ingelfingen (DE)

( * ) Notice: Subject to any disclaimer, the term of this patent is extended or adjusted under 35 U.S.C. 154(b) by 0 days.

(21) Appl. No.: 14/731,907

(22) Filed: Jun. 5, 2015

(65) Prior Publication Data

US 2015/0354718 A1 Dec. 10, 2015

(30) Foreign Application Priority Data

Jun. 6, 2014 (DE) .................... 20 2014 102 658 U (51) Int. Cl.
*F16K 7/12* (2006.01)
*F16K 27/02* (2006.01)

(52) U.S. Cl.
CPC ............... *F16K 7/126* (2013.01); *F16K 7/12* (2013.01); *F16K 27/0236* (2013.01); *Y10T 137/6065* (2015.04)

(58) Field of Classification Search
CPC ........ F16K 7/126; F16K 7/12; F16K 27/0236; Y10T 137/6065
See application file for complete search history.

(56) References Cited

U.S. PATENT DOCUMENTS

| | | | | |
|---|---|---|---|---|
| 2,863,631 A | * | 12/1958 | Boteler | F16K 7/126 220/243 |
| 5,295,662 A | * | 3/1994 | Yamaji | F16K 41/12 251/274 |
| 6,763,701 B1 | * | 7/2004 | Moretz | F16L 37/252 285/362 |
| 7,926,785 B2 | * | 4/2011 | Wincek | F16K 7/126 251/331 |

(Continued)

FOREIGN PATENT DOCUMENTS

| | | |
|---|---|---|
| DE | 101 5 3362 | 5/2003 |
| DE | 10 2008 045 857 | 3/2010 |

(Continued)

OTHER PUBLICATIONS

Search Report for DE 20 2014 102 658.4 (mailed Aug. 28, 2014).

*Primary Examiner* — Kevin Murphy
*Assistant Examiner* — Patrick Williams
(74) *Attorney, Agent, or Firm* — Klarquist Sparkman, LLP (57) ABSTRACT

A diaphragm valve comprises at least one valve body which has at least one inlet, at least one outlet, at least one flow channel and at least one shutoff web dividing the flow channel into channel portions. The diaphragm valve furthermore comprises a diaphragm which rests on a circumferential sealing seat of the valve body, and a drive having a drive housing, the drive being coupled to the diaphragm to press the diaphragm against the shutoff web for closing the valve. The diaphragm valve furthermore comprises a fastening unit for detachably locking the drive to the valve body, the fasting unit having a bayonet cap and an additional central retightening unit by means of which an axial tightening force is generated.

9 Claims, 5 Drawing Sheets

(56) References Cited

U.S. PATENT DOCUMENTS 8,720,858 B2    5/2014  Bottcher et al.
2006/0249953 A1*  11/2006  Gill ........................ B65D 83/38
                                                              285/324
2009/0095935 A1   4/2009  Wlodarczyk

FOREIGN PATENT DOCUMENTS

| DE | 10 2010 063 519 | 6/2012 |
| DE | 10 2011 003 537 | 8/2012 |
| EP | 2 484 944 A2 | 8/2012 |
| WO | WO 2012/084296 | 6/2012 |
| WO | WO 2014/015326 | 1/2014 |

\* cited by examiner

000# DIAPHRAGM VALVE

CROSS REFERENCE TO RELATED APPLICATION

The present application claims priority from pending German Patent Application No. 20 2014 102 658.4, filed Jun. 6, 2014, which is incorporated herein by reference.

FIELD

The invention relates to a diaphragm valve. The invention relates to any types of diaphragm valves having manually, pneumatically, hydraulically or electrically driven drives which usually move the diaphragm via spindles and cause an opening or closing of the valve. The drive is configured as a separate unit which is usually detachably mounted to the valve body. The diaphragm is then arranged between the valve body and the drive.

BACKGROUND

Up to now, the diaphragm has been clamped to the valve seat such that the drive housing, for example, is fastened to the valve body by means of several screws distributed on the periphery and the diaphragm is clamped therebetween. The difficulty of this fastening consists in that the screws do not uniformly clamp the diaphragm as it is not possible to tighten all screws to exactly the same compression distance. An uneven compression of the diaphragm may however lead to a leakage between the valve body and the diaphragm and to a reduction of the service life of the diaphragm itself. Furthermore, the several screws can easily be lost during mounting or demounting of the drive or could fall into the flow channel.

DE 101 53 362 A1 provides a fastening unit having a central union nut for connecting the drive to the valve body which permits a constant compression of the diaphragm. However, just in case of an overhead mounting, it is not always easy to assemble the partly heavy diaphragm valves after the valve body has usually been mounted into a drive train and possibly merely the diaphragm is to be replaced.

The invention provides a diaphragm valve in which the mounting of the drive and the replacement of the diaphragm are simplified and accelerated and a uniform and process reliable diaphragm clamping is ensured.

SUMMARY

The diaphragm valve according to the invention comprises at least one valve body which has at least one inlet, at least one outlet, at least one flow channel and at least one shutoff web dividing the flow channel into channel portions, a diaphragm resting on a circumferential sealing seat of the valve body, a drive having a drive housing, the drive being coupled to the diaphragm to press the diaphragm against the shutoff web for closing the valve, and a fastening unit for detachably locking the drive to the valve body, wherein the fastening unit has a bayonet cap and an additional central retightening unit, an axial tightening force being generated by the retightening unit and may preferably be increased in a stepless manner.

In the diaphragm valve according to the invention, the drive can be very quickly mounted overhead and more specifically via the bayonet cap. A bayonet cap can however result in the parts clamped therebetween being not sufficiently compressed and in the present case the diaphragm being not sufficiently impermeable. Furthermore, a higher axial shifting force which could be obtained by a long torsional path of the bayonet cap includes the risk that the inserted diaphragm is subject to shear by the rotational movement and will suffer damage. In the invention, the bayonet cap serves to a quick fastening, and the retightening unit then ensures that the required tightening and clamping force is exerted onto the diaphragm. A central retightening unit and not numerous screws to be tightened provide for a uniform additional tightening force which is applied by the retightening unit.

One embodiment of the invention provides that the retightening unit is a union nut and is thus a part that is very simple to manufacture.

The bayonet cap may furthermore comprise a clamping ring having projecting claws which engage behind projections on the side of the valve body.

The retightening unit can engage the clamping ring and shift the latter in the axial direction. The retightening unit and the bayonet cap are thus coupled by common parts, which reduces the required space.

The retightening unit has for example a supporting face via which it is axially supported by the drive housing to press the drive housing axially towards the diaphragm. The retightening unit thus acts like a clamp in which one end is the drive housing and the other end is the valve body which is coupled to the retightening unit via the bayonet cap.

The drive housing can be configured in several pieces and have an attachment housing part by which the retightening unit is supported. This means that the attachment housing part has the mating face to the supporting face.

The attachment housing part not only has the function that the retightening unit can engage thereon, but also has a circumferential edge by means of which it pushes against the diaphragm and presses the diaphragm against the sealing seat.

The supporting face of the retightening unit rests for example against a shoulder of the attachment housing part.

If the attachment housing part is configured in a top-shaped or bell-shaped manner, the fastening of a drive spindle to the diaphragm can be accommodated in the hollow interior thereof. Usually, which is however not to be understood in a limiting manner, a coupling part which receives the spindle in a form-fitting manner is provided between the diaphragm and the spindle.

It is possibly more costly to manufacture the attachment housing part with shoulders or particular surfaces. It is therefore configured as a separate part which is coupled to a main housing of the drive. This main housing is axially adjacent to the attachment housing and is connected therewith, and is however in particular configured so as to be rotatable with respect thereto.

The attachment housing part and the clamping ring may be coupled to each other for joint rotation but in an axially displaceable manner by means of an axial guiding so that the bayonet cap may be detached and closed by the rotation of the attachment housing part, which permits a simple access for mounting.

Furthermore, the diaphragm may be coupled to the attachment housing part for joint rotation therewith by a form-fitting, for example via one or more projecting tongues, the attachment housing part then having appropriate recesses.

Furthermore, the attachment housing part has a centering for the diaphragm received therein. This can for example be obtained by an axially symmetrical centering collar.

The fastening unit and the drive housing are for example configured such that the diaphragm is laterally visible at the circumference. This relevant property results in little leakages being immediately detected which is impossible in the prior art, in particular if a union nut is used. Here, the diaphragm is entirely mounted, i.e., is not visible from the outside. In contrast thereto, in the invention, it is also possible to determine the design of the diaphragm or the material of the diaphragm from the outside, for example by inscriptions at the edge of the diaphragm, which facilitates the replacing of the diaphragm in case the diaphragm last used can be identified from the outside.

The bayonet cap may be a clamping ring having wing tightening claws which axially engage around a radial flange portion at the valve body so that the wing tightening claws, as seen in the radial view, have the shape of a lying "U" in which one leg is integrally formed with the clamping ring.

An alternative embodiment provides that the bayonet cap is a clamping ring having radially projecting hooks which grasp mushroom-shaped holders below the mushroom head on the side of the valve seat.

It must be emphasized that the diaphragm valve according to the invention is not limited to two-way valve bodies, but may of course also be used in multifunctional valve bodies including diaphragm valves having several drives and several shutoff webs.

DETAILED DESCRIPTION

Figure 1:
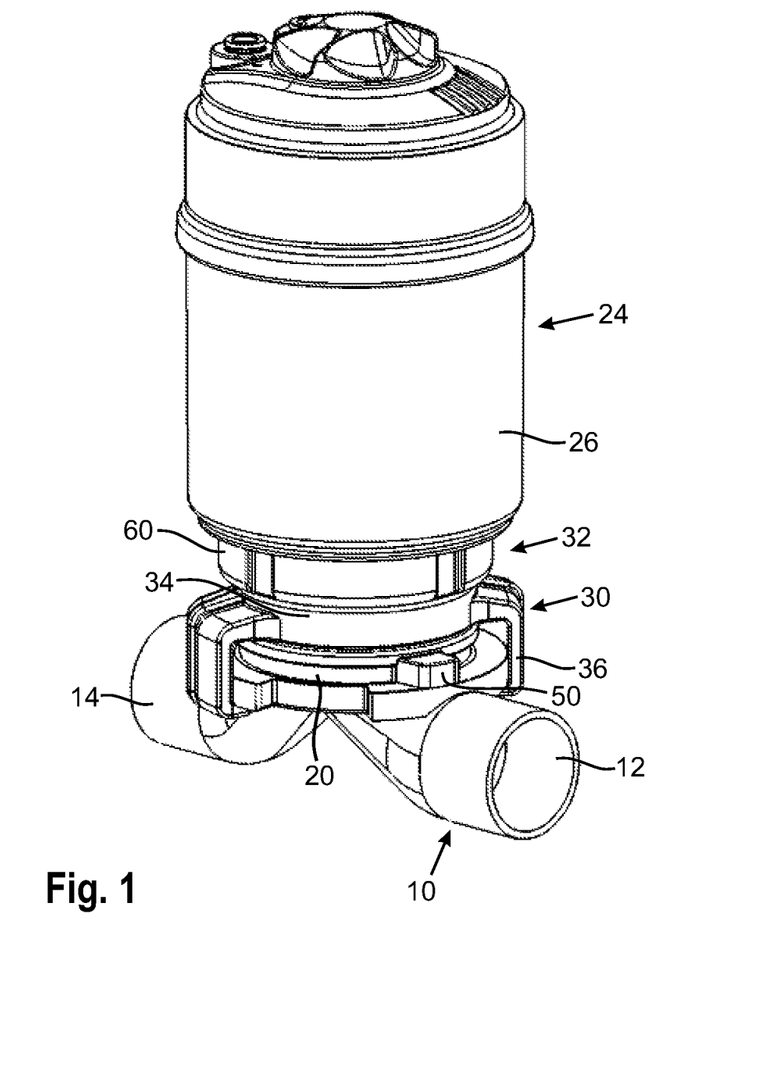
FIG. 1 a first embodiment of the diaphragm valve according to the invention, FIG. 2 a second embodiment of the diaphragm valve according to the invention, FIG. 3 an explosive view of the diaphragm valve of FIG. 1 in the region of the valve body and of the fastening of the drive housing, FIG. 4 an explosive view of the diaphragm valve of FIG. 2 in the region of the valve body and of the fastening of the drive housing, FIG. 5 a sectional view through the diaphragm valve of FIG. 1 in the region of the valve body and of the fastening of the drive housing, and FIG. 6 a sectional view through the diaphragm valve of FIG. 2 in the region of the valve body and of the fastening of the drive housing.
Figure 3:
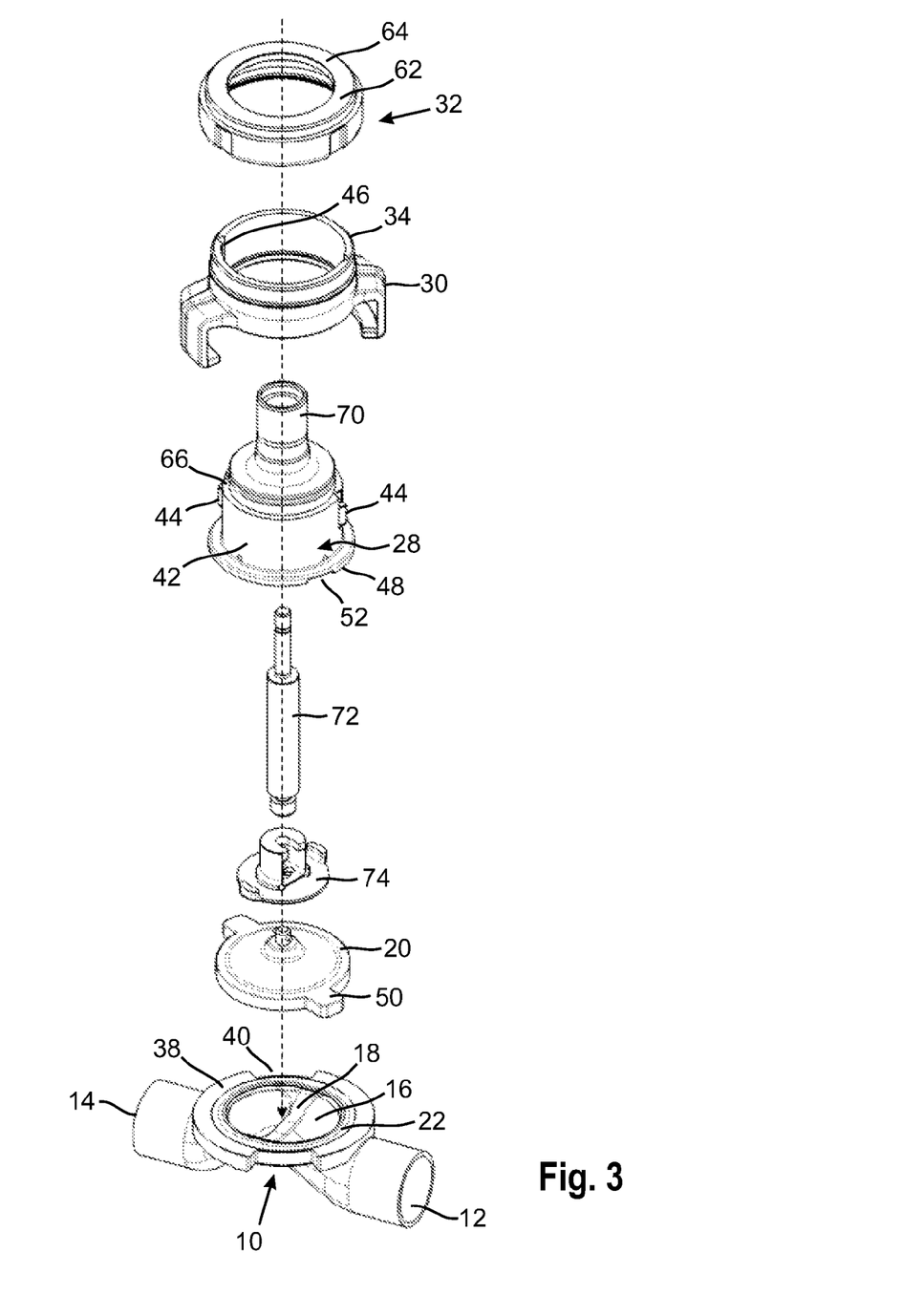

FIG. 1 shows a diaphragm valve which has several components, substantially a valve body 10 which is here configured as a two-way valve body and has an inlet 12 and an outlet 14 and a flow channel 16 connecting the inlet 12 and the outlet 14, see FIG. 3, and a drive 24.

The flow channel 16 has two channel portions which begin on both sides of a shutoff web 18.

The shutoff web 18 is usually an edge of an overflow opening between the channel portions which can however optionally be closed by a diaphragm 20.

The diaphragm 20 covers an opening above the shutoff web 18 in the valve body 10 which can be seen in FIG. 3 at reference numbers 16, 18. This opening is surrounded by a flange-type annular sealing seat 22 at the valve body 10 against which the diaphragm 20 rests in a circumferentially closed manner.

A drive 24 for switching the diaphragm 20 and thus the valve is represented for an upward and downward movement of the diaphragm 20. The drive 24 is in particular a linear drive which can be operated manually, pneumatically, hydraulically or electrically.

The drive 24 has an outer housing which has several parts, more specifically a main housing 26, among other things, which is preferably cylindrical, and an attachment housing part 28 which is mounted between the main housing 26 and the valve body 10 and which is in the present case substantially configured in a bell-shaped manner.

The connection between the drive housing 24 and the valve body 10 is configured as a demountable connection, namely via a bayonet cap 30 on the one hand and a retightening unit 32 on the other hand, which form together a fastening unit.

Figure 2:
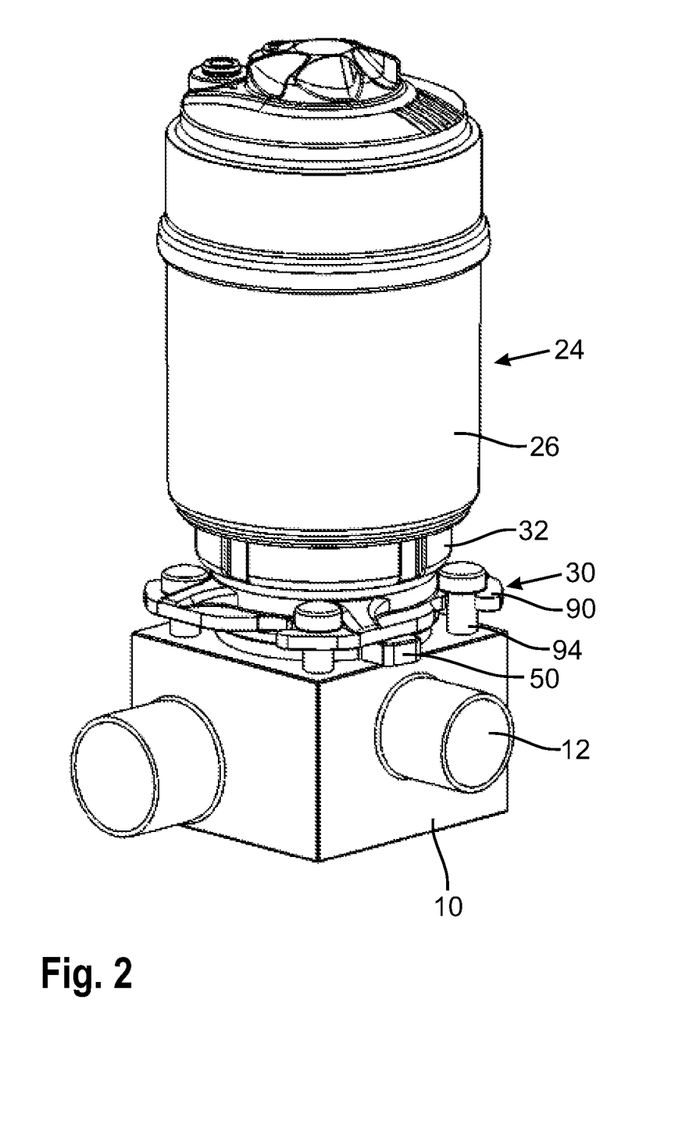

The bayonet cap 30 comprises a clamping ring 34 having projecting claws, according to FIGS. 1 and 2 so-called wing tightening claws 36 which have the shape of a lying "U" and engage behind projections on the side of the valve body, here radial flange portions 38 when they are first axially inserted into gaps 40 and are then rotated behind the flange portions 38. Appropriate wedge surfaces ensure an axial pretensioning which is generated when the bayonet cap 30 is arrested.

The clamping ring 34 rests on the inside in a centered manner on a cylindrical surface 42 of the attachment housing part 28 (see FIGS. 3 and 5) and is furthermore connected with the attachment housing part 28 for joint rotation therewith but in an axially displaceable manner via axial guides, here axial projections 44 on the attachment housing part 28 and corresponding grooves 46 on the inner side of the clamping ring 34. The attachment housing part is shifted axially downwards.

Figure 5:
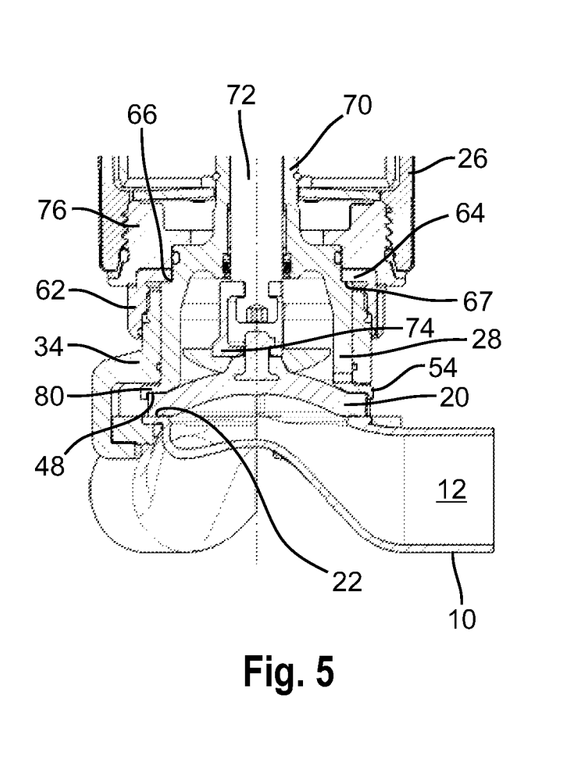

A closed circumferential edge 48 on an end face of the attachment housing part 28, here on an outwardly projecting ring flange 80 tightly presses the diaphragm 20 at the circumferential edge thereof against the sealing seat 22 (see FIG. 5).

The diaphragm 20 is coupled to the attachment housing part 28 for joint rotation therewith by a form-fit, more specifically by projections visible in FIG. 3 which are configured as laterally projecting tongues 50 and are mounted in appropriate recesses 52 in the attachment housing part 28.

As is clearly visible in FIGS. 3 and 5, the ring flange 80 of the attachment housing part 28 has radially outside of the circumferential edge 48 a centering collar 54 which projects axially towards the diaphragm 20, against which the diaphragm 20 rests and by means of which it is centered. The recesses 52 are provided only in the collar 54 so that the circumferential edge 48 forming a clamping face is configured without any depression.

The retightening unit 32 with a union nut 62 serves to provide a fastening unit along with the bayonet cap 30 for a detachable arresting of the drive 24 to the valve body 10.

The retightening unit 32 is configured as a union nut 62 having an inwardly projecting closed circumferential ring flange 64 which rests against a shoulder 66 of the attachment housing part 28 via a supporting face 67.

The union nut 62 has an internal thread which receives an external thread of the clamping ring 34 (see FIG. 5).

Figure 4:
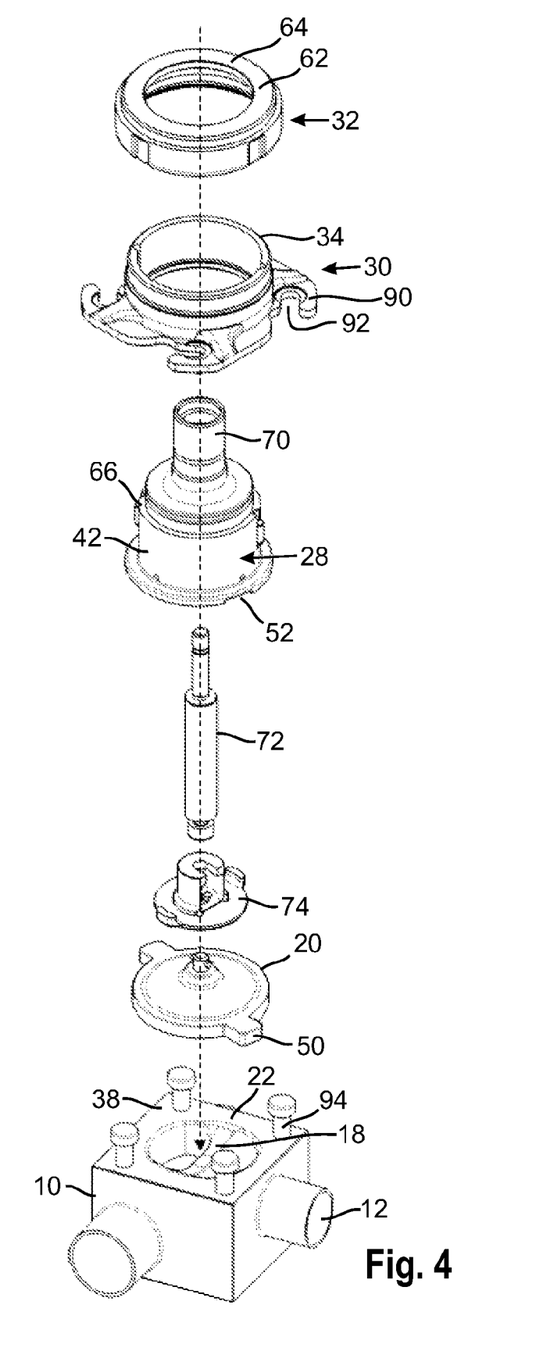

In FIGS. 3 and 4, it can also be seen that the attachment housing part 28 has a sleeve projection 70 by means of which it enters the interior of the main housing 26 and serves as a guiding for a lifting spindle 72.

The lifting spindle 72 is axially displaced by the drive mechanism or manually.

At the lower end, the lifting spindle 72 is coupled to the diaphragm 20 via a coupling part 74 and more specifically in a generally form-fitting manner as shown in FIGS. 3 and 5.

The main housing 26 comprises a substantially cylindrical outer wall and a screwed-in end wall 76 which forms a guiding face for the housing attachment part 28, more specifically a pivot bearing surface. The main housing 26 can be rotated arbitrarily with respect to the attachment housing part 28 to position the energy and/or signaling terminals in an optimum manner, for example.

As can be seen in particular from FIG. 5, the attachment housing part 28, the drive 24 and the fastening unit form along with the retightening unit 32 and the bayonet cap 30 a pre-mounted unit, which means that no loose parts are present when the drive 24 is to be fastened to the valve body 10.

To fasten the drive 24, the union nut 62 is first rotated in a loose manner such that with reference to FIG. 5, the clamping ring 34 is rotated downwards as far as possible with respect to the attachment housing part 28. To this end, the union nut 62 can be supported on the end face by the end wall 76.

The clamping ring 34 creeps downwards until it abuts on the end face against the ring flange 80 of the attachment housing part 28 which projects outwards like a shoulder. In this position, the drive 24 is placed onto the valve body 10. By the engagement on the wing tightening claws 36 for example, the bayonet cap 30 is then closed, the claws 36 being easily inserted into the radial flange portions 38 by oblique surfaces which slide onto each other. The retightening unit 32 is then actuated by rotating the union nut 62. By the support by the shoulder 66, the union nut 62 pulls the axially guided clamping ring 34 upwards, i.e., towards the drive 24 so that the clamping force is increased uniformly and centrally by one single actuation or, in other terms, the attachment housing part 28 is pressed axially downwards.

As is in particular visible in FIG. 1, the diaphragm 20, more specifically the circumferential edge thereof is visible laterally from the outside in the region of the clamping in the fastened state so that leakages are immediately detectable.

Figure 6:
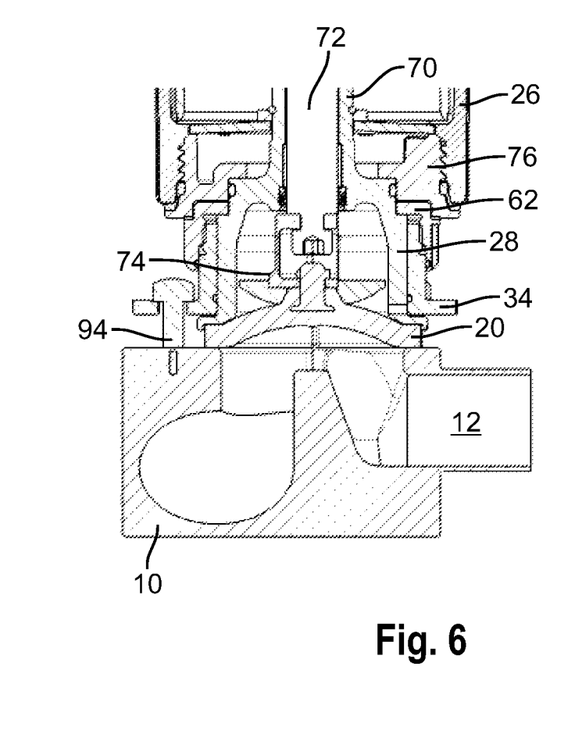

The embodiment according to FIGS. 2, 4 and 6 substantially corresponds to the just described Figures, FIG. 2 being the view corresponding to FIG. 1, FIG. 4 being the view corresponding to FIG. 3, and FIG. 6 being the view corresponding to FIG. 5. The already introduced reference numbers are again used for identical or functionally identical parts so that only the differences are explained below.

In the embodiment of FIGS. 2, 4 and 6, the valve body 10 is a multifunctional valve body having several inlets and/or outlets. This valve body 10 is also coupled to the drive 24 via a fastening unit having a bayonet cap 30 and a retightening unit 32, and in this respect, there is in principle no difference.

In this embodiment, the bayonet cap 30 is however configured in a different manner. Here, the clamping ring 34 has claws in the form of hooks 90 which project radially at one end and form forks 92 open on one side in the circumferential direction. Mushroom shaped holders 94 are present at the valve body 10 in one piece or by their own parts which can be molded screws, for example.

In this case, the drive 24 is also placed onto the valve body 10 along with the fastening unit mounted thereon, and the clamping ring 34 is then rotated such that the holders 94 enter the forks 92 with their mushroom heads. The fastening unit is then further axially pretensioned by the retightening unit 32 to clamp the diaphragm 20 at the circumference.

The diaphragm 20 is also visible on the circumferential side in this embodiment.

It must be emphasized that the different valve bodies 10 and bayonet caps 30 may of course arbitrarily be combined with each other.

The invention claimed is:

1. A diaphragm valve, comprising at least one valve body which has at least one inlet, at least one outlet, at least one flow channel and at least one shutoff web dividing the flow channel into channel portions, a diaphragm resting on a circumferential sealing seat of the valve body, a drive having a drive housing, the drive being coupled to the diaphragm to press the diaphragm against the shutoff web for closing the valve, and a fastening unit for detachably locking the drive to the valve body, wherein the fastening unit has a bayonet cap comprising a clamping ring and an additional central retightening unit in the form of a union nut screwed on the clamping ring, wherein the drive housing is formed in several parts and has an attachment housing part, wherein the retightening unit surrounds the attachment housing part in circumferential direction, the attachment housing part supporting the retightening unit such that the retightening unit is able to push the attachment housing part axially towards the diaphragm, an axial tightening force being generated by the retightening unit, wherein the fastening unit and the drive housing are configured such that the diaphragm is laterally visible at the circumference.

2. The diaphragm valve according to claim 1, wherein the clamping ring has projecting claws which engage behind valve-side projections.

3. The diaphragm valve according to claim 2, wherein the retightening unit engages the clamping ring and can shift the clamping ring in axial direction.

4. The diaphragm valve according to claim 1, wherein the attachment housing part presses the diaphragm against the sealing seat by means of a circumferential edge.

5. The diaphragm valve according to claim 4, wherein the retightening unit has a supporting face via which it is axially supported by the drive housing to press the drive housing axially towards the diaphragm and wherein the supporting face rests on a shoulder of the attachment housing part.

6. The diaphragm valve according to claim 1, wherein the attachment housing part is configured in a bell-shaped manner having a hollow interior and receives in its hollow interior the fastening of a drive spindle along with the diaphragm.

7. The diaphragm valve according to claim 1, wherein the clamping ring has wing tightening claws which axially engage around a radial flange portion on the valve body.

8. The diaphragm valve according to claim 1, wherein the clamping ring has radially projecting hooks which engage mushroom holders on the side of the valve seat.

9. A diaphragm valve, comprising at least one valve body which has at least one inlet, at least one outlet, at least one flow channel and at least one shutoff web dividing the flow channel into channel portions, a diaphragm resting on a circumferential sealing seat of the valve body, a drive having a drive housing, the drive being coupled to the diaphragm to press the diaphragm against the shutoff web for closing the valve, and a fastening unit for detachably locking the drive to the valve body, wherein the fastening unit has a bayonet cap comprising a clamping ring and an additional central retightening unit in the form of a union nut screwed on the clamping ring, wherein the drive housing is formed in several parts and has an attachment housing part, wherein the retightening unit surrounds the attachment housing part in circumferential direction, the attachment housing part supporting the retightening unit such that the retightening unit is able to push the attachment housing part axially towards the diaphragm, an axial tightening force being generated by the retightening unit, wherein the clamping ring has radially projecting hooks which engage mushroom holders on the side of the valve seat.

* * * * *